US010515103B2

(12) United States Patent
Li

(10) Patent No.: US 10,515,103 B2
(45) Date of Patent: Dec. 24, 2019

(54) METHOD AND SYSTEM FOR MANAGING VIEWABILITY OF LOCATION-BASED SPATIAL OBJECT

(71) Applicant: Yu-Hsien Li, Taipei (TW)

(72) Inventor: Yu-Hsien Li, Taipei (TW)

(\*) Notice: Subject to any disclaimer, the term of this patent is extended or adjusted under 35 U.S.C. 154(b) by 275 days.

(21) Appl. No.: 15/645,038

(22) Filed: Jul. 10, 2017

(65) Prior Publication Data
US 2018/0300356 A1 Oct. 18, 2018

(30) Foreign Application Priority Data
Apr. 14, 2017 (TW) .............................. 106112683 A

(51) Int. Cl.
*G06F 16/00* (2019.01)
*G06F 16/29* (2019.01)
*G06F 16/44* (2019.01)
*G06F 16/9537* (2019.01)
*G06F 7/08* (2006.01)
*G06T 11/60* (2006.01)
G06Q 30/02 (2012.01)

(52) U.S. Cl.
CPC ............... *G06F 16/29* (2019.01); *G06F 7/08* (2013.01); *G06F 16/444* (2019.01); *G06F 16/9537* (2019.01); *G06T 11/60* (2013.01); G06Q 30/0256 (2013.01); G06Q 30/0261 (2013.01); G06Q 30/0283 (2013.01); G06T 2200/24 (2013.01)

(58) Field of Classification Search
CPC .... G06F 16/29; G06F 16/444; G06F 16/9537; G06F 7/08; G06T 11/60; G06Q 30/0261
See application file for complete search history.

(56) References Cited

U.S. PATENT DOCUMENTS

2003/0074356 A1\* 4/2003 Kaler .................. G06F 21/6218
2008/0162707 A1 7/2008 Beck et al.
(Continued)

FOREIGN PATENT DOCUMENTS

CN 102843347 A 12/2012
CN 102958114 A 3/2013
(Continued)

*Primary Examiner* — Alexander Khong
(74) *Attorney, Agent, or Firm* — Li & Cai Intellectual Property (USA) Office

(57) ABSTRACT

The disclosure is related to a method and a system for managing viewability of a location-based spatial object. The system provides subscribers to set up searching criteria for every spatial object through the viewability management mechanism. A viewable range for a spatial object is such as a spatial range, a user range and/or a time range. While the system inspects the spatial information and searching criteria of the spatial objects registered in a database, it may be found that the viewable ranges of multiple spatial objects are interfered under the same searching criteria. Thus, the system allows the subscribers to assign ranking weights to different spatial objects for giving them different values. As a result, the system adjusts an order to display the multiple spatial objects according to their ranking weights under the same searching criteria. A search result is displayed through an augmented-reality technology in a terminal device.

18 Claims, 15 Drawing Sheets

(56) References Cited

U.S. PATENT DOCUMENTS

| | | | |
|---|---|---|---|
| 2011/0157179 A1* | 6/2011 | Fahn | G06T 19/006 345/427 |
| 2012/0203780 A1* | 8/2012 | Kowalchuck | G06Q 30/02 707/733 |
| 2013/0321466 A1* | 12/2013 | Kocienda | G01C 21/26 345/635 |
| 2014/0139519 A1* | 5/2014 | Mit | G06T 17/05 345/419 |
| 2014/0236942 A1* | 8/2014 | Li | G06Q 30/02 707/735 |
| 2014/0289530 A1 | 9/2014 | De Waal et al. | |
| 2016/0358019 A1* | 12/2016 | Kato | G06T 7/70 |
| 2017/0060459 A1* | 3/2017 | Kaczmarek | G06F 3/0619 |

FOREIGN PATENT DOCUMENTS

| | | |
|---|---|---|
| EP | 2602729 A1 | 6/2013 |
| WO | 2010111683 A2 | 9/2010 |

\* cited by examiner

Type of the uploaded spatial object
☐ TEXT
☐ IMAGE
☐ VIDEO
☐ AUDIO
~901

FIG. 9A

Target to access the spatial object
☐ AGE  10 ———•——— 60
☐ GENDER: ○Male○Female
☐ TIME : __/__/__~__/__/__
~902

FIG. 9B

User range
☐ Specifying a User: ___
☐ Specifying Relevant Users: ___
☐ All Users

—903

METHOD AND SYSTEM FOR MANAGING VIEWABILITY OF LOCATION-BASED SPATIAL OBJECT

BACKGROUND OF THE INVENTION

1. Field of the Invention

The disclosure is generally related to a technology for managing a spatial object within a three-dimensional space, and in particular to a method and a system for managing viewability of a location-based spatial object, and especially managing multiple spatial objects that are overlapped with each other in the 3D space.

2. Description of Related Art

According to a conventional application, a user utilizes a mobile device to execute a proprietary application, e.g. an APP, for activating a camera module. The camera module is driven to capture a real scene and the real scene is displayed on a screen of the mobile device. The application enables an augmented reality technology that allows an image object to be shown in the real scene.

In general, the augmented reality technology requires a software routine to recognize a marker within the real scene through the camera module of the mobile device. The marker is referred to in order to initiate the image object. The augmented reality technology uses a well-defined correlation between the marker and the image object to show the image object in the software routine.

Another conventional augmented reality technology relies on location-based information to initiate the image object. This means that the image object defined in the software is initiated based on a location of the mobile device. A user manipulates the mobile device to find out and display the image object based on its location that is rendered by a global positioning signal generated by a GPS module installed in the mobile device. In the meantime, an azimuth angle signal can be generated by a gyroscope of the mobile device for positioning an elevation angle of the mobile device. This positioning information acts as the reference provided for a server that directs the software program in the mobile device to show the image object.

These mentioned technologies of augmented reality or location-based method merely create circumstances that allow the user to have the reality experience or a recreation. Moreover, a search engine company offers commercial advertising to business owners, which would bring the business a better impact of the ranking on the search results. Such a commercial promotion is a relevant advertisement provided to a user who searches in a related field.

However, none of the conventional technologies provides a platform that allows users to set up any location-relevant image for others to search a location-based image using the augmented reality technology. Furthermore, when many location-based image objects acting as the virtual messages are provided by different advertisers, they may result in high possibility to cause interference with each other about their positions.

SUMMARY OF THE INVENTION

The disclosure is related to a method and a system for managing viewability of a location-based spatial object. The system provides a server rendering a scheme of remote management for the location-based spatial object. The system gives every spatial object a ranking weight according the parameters made by the subscriber's requirement. One of the objectives of the system is to adjust a display order of the multiple spatial objects that are interfered with each other. For example, the spatial objects may be overlapped in their viewable ranges under the same searching criteria, and the system adjusts the display order of the spatial objects. The system solves the problems of the interferences of the spatial objects when a user searches the plural objects at a time.

The spatial object is a virtual object disposed in a spatial range, and the object can be any or a combination of a text, an image, a video and an audio. The user can search the spatial object by a mobile device using an AR technology. The system determines a range for displaying any spatial object according to the location and orientation of the mobile device. Then the spatial object can be combined with a real scene and then the combination can be displayed on the mobile device.

In an exemplary embodiment, the method for managing viewability of a location-based spatial object is performed in a server. The server provides a remote management interface for receiving a plurality of computer-configurable spatial objects, and spatial information and searching criteria corresponding to every spatial object from multiple subscribers. A database including the plurality of location-based spatial objects can be established.

In the method, a subscriber of the system requests for setting up a spatial object to the system. The management system provides a remote management interface, e.g. a web page, acting as a user interface. The remote management interface can be proprietary software that allows the subscriber to access the database.

The subscriber, e.g. a provider of the spatial object, uploads the spatial object, and sets up the spatial information corresponding to the spatial object through the remote management interface. The spatial information is a ground-position data that associates with a spatial-angle data of the spatial object. The spatial angle is a combination of an azimuth angle and an elevation angle.

The system queries the database for obtaining the information of the potential users who are able to access the spatial object that indicates number of the potential users, an age distribution and genders. The system transmits the information to the provider of the spatial object.

The provider of the spatial object can set up a time range of the spatial object. The system can obtain the information of the users that can access the spatial object within the time range. The system obtains a viewable range through computation by a processor. The viewable range includes a spatial range and a time range that form the searching criteria associated with the spatial object. The provider of the spatial object can further set up an age range and a gender range that confine the users who can access the spatial object.

When the system determines some spatial objects that interfere with each other in the searching criteria, the provider of the spatial object can set up the ranking weight to affect the display order. The provider can therefore acquire a higher display order for his/her spatial object through the scheme of ranking weight when some other spatial objects exist in the same searching criteria. The system then completes this setting.

According to one of the embodiments, the system for managing the viewability of the location-based spatial object includes a database that records multiple spatial objects and spatial information and searching criteria corresponding to every spatial object from multiple subscribers. In the database, every spatial object's positioning data and/or image data and the spatial object's corresponding searching criteria are recorded. The system includes the server that renders a remote management interface and provides the database recording the spatial objects and their corresponding spatial information from multiple subscribers.

The server includes one or more processors that perform the method for managing viewability of the location-based spatial object.

BRIEF DESCRIPTION OF THE DRAWINGS

FIG. 9A through FIG. 9D show schematic diagrams depicting setting up the various viewable ranges in the system according to one of the embodiments.

DETAILED DESCRIPTION OF THE PREFERRED EMBODIMENTS

Figure 1A:
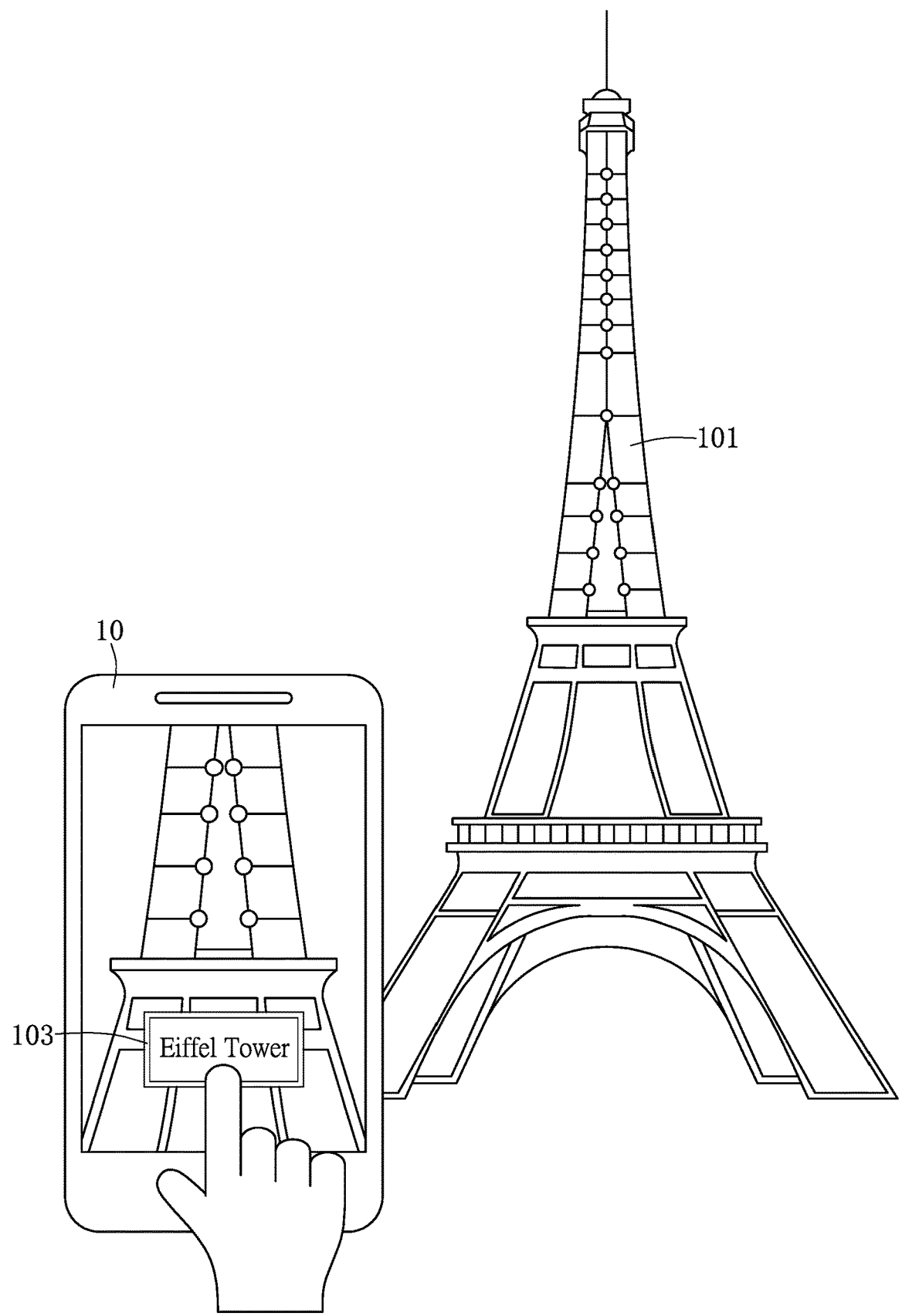
FIGS. 1A to 1C show schematic diagrams describing circumstances of a user manipulating a mobile device to create a location-based spatial object in one embodiment of the present disclosure.

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure in accordance with the present disclosure is relating to a method and a system for managing viewability of a location-based spatial object. The management system introduces a cloud system that allows a user to operate a mobile device installed with a software program to search a spatial object. In particular, the spatial object is an object located in a three-dimensional space, e.g., a real space, where the user is situated. The cloud system renders a search service that outputs the spatial object according to positioning information of the mobile device and image information of a real scene associated with the spatial object.

The management system of remote management in accordance with the present disclosure provides a management server and a database. The management server initiates a remote management interface that allows a subscriber to access the location-based spatial object and its content over a network. The system provides a search database that renders the search service. A search engine is therefore established and provided for the user to search the location-based spatial object by operating the mobile device with the corresponding positioning information.

The system for remote management of the present disclosure renders a management server that allows the subscriber to remotely manage the spatial object at a specific position and orientation. The system further assigns the spatial object with search criteria such as a time range, a viewable range, and/or a user range. Through this system for remote management, the subscriber needs not to visit the place of the spatial object in person.

The spatial object is a virtual object. The user can search the spatial object using his/her mobile device when the positioning information of the mobile device conforms to the spatial information of the spatial object. In addition to obtaining the virtual object while viewing the real scene, the user can access more information relating to the spatial object. The spatial object can be one or any combination selected from a group of a text, an image, a video, and an audio.

In the system for managing the viewability of the location-based spatial object, the server allows the subscribers to remotely manage the spatial objects that are disposed at their positions and directions. The system also allows the subscribers to set up the viewable range for each spatial object. The viewable range for each spatial object corresponds to the searching criteria such as a spatial range, a user range and a time range. In particular, the plural spatial objects may be overlapped in the same searching criteria. For example, the spatial objects may be overlapped within a spatial range at overlapped time range. The system initiates a mechanism that allows the subscribers to manage the viewable ranges of the spatial objects. The subscriber can set up a ranking weight for the spatial object, and that is to give every spatial object a value for affecting a display order based on the ranking weight when they are searched.

The subscriber can be an advertiser, and the spatial object can be an advertisement. The system allows the advertiser to place the advertisement in form of the spatial object in multiple places. While the advertiser can still send a person using a mobile device with the software program to set up the spatial object on-site, through the system for remote management of the location-based spatial object in accordance with the present disclosure, the advertiser can concurrently set up various spatial ranges for multiple spatial objects viewable for users. The plurality of spatial objects recorded in the management system implement a search engine for the spatial objects.

In an exemplary example, the advertiser is such as an operator of a chain store, a department store, a shop, or a shopping mall. When a chain restaurant launches a new product or a promotional activity, the remote management system allows the operator to place advertisements to restaurants at different locations. The system also allows the operator to configure multiple viewable ranges and various time ranges for the restaurants. After that, the user can utilize the mobile device to search the spatial object and gain information relating to the restaurant.

In the case of an individual subscriber, the system also allows the individual subscriber or enterprise subscriber to set up a single spatial object to be at a certain location or direction, to have a time range, or to be viewable by one or more users when the subscriber cannot visit the place in person. In other words, the individual subscriber can authorize one or more users in a group to access the spatial object via the system. The authorized user can then operate a mobile device with the related software program to access the spatial object within viewable range, and the spatial object is able to combine with an instant real scene.

After that, the system provides a service for the user to search for the spatial object(s) at the location where the user operates his mobile device. The positioning information generated by a sensor of the mobile device in operation is automatically transmitted to a cloud system. In the meantime, a camera of the mobile device is activated to capture a real scene image at the location. The image information extracted from the real scene image acts as auxiliary information for the purpose of positioning. The system provides a search result of the spatial object(s) according to the positioning information and image information. The mobile device then displays the spatial object combined with the real scene image.

The system for managing viewability of the location-based spatial object in accordance with the present disclosure is implemented by a cloud system. The cloud system provides a software program for the end subscriber to set up the spatial object(s) at various locations, and results in establishment of consolidated information for spatial objects of a database. The system allows the subscribers to set up the spatial objects remotely through the remote management interface.

Figure 1B:
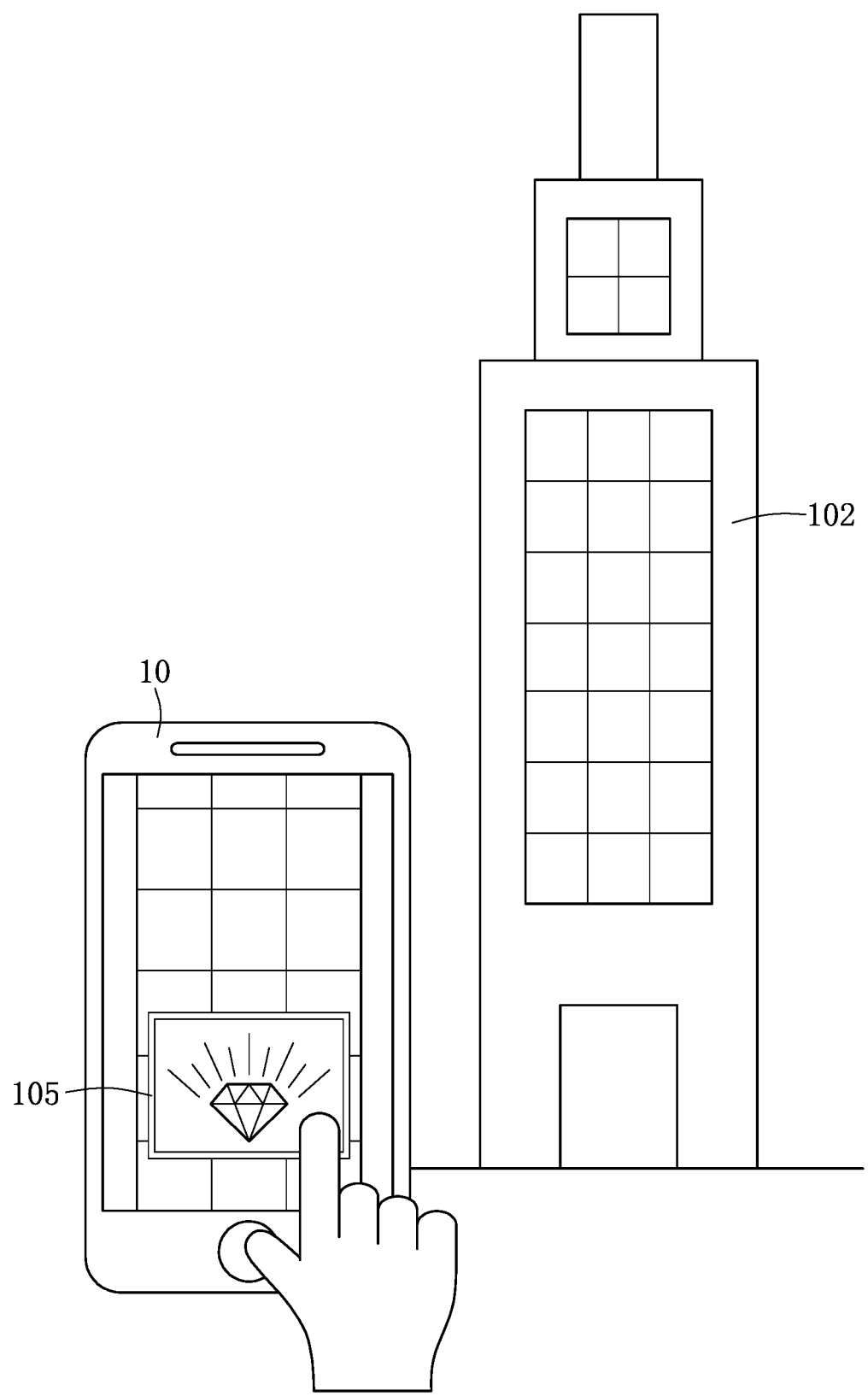
Figure 1C:
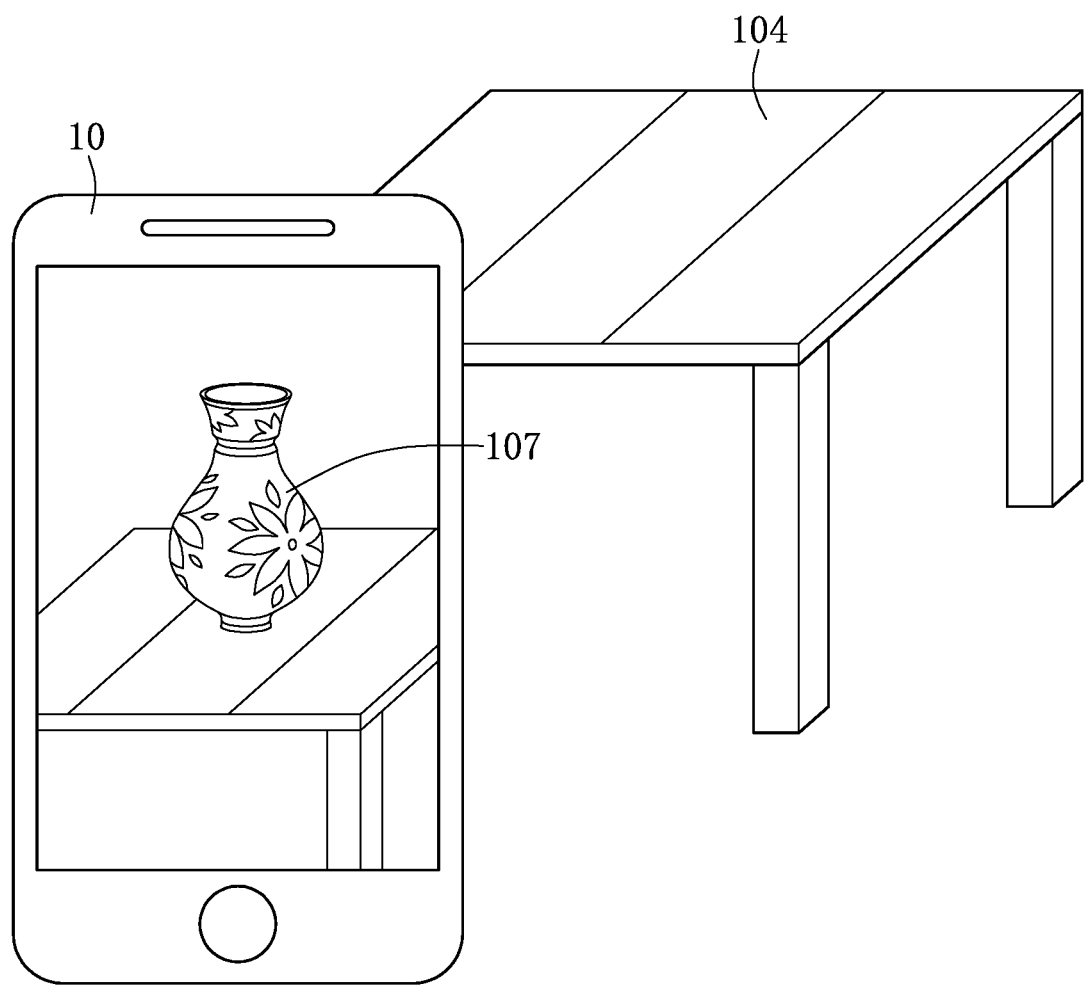

Several schematic diagrams illustrating circumstances describing the method for creating a location-based spatial object using a mobile device are shown in FIG. 1A through FIG. 1C.

As FIG. 1A shows, a user utilizes a mobile device 10 to install a software program provided by an application system. The software program is such as an APP installed in an intelligent device. When the software program is initiated, the operation is under a data establishment mode. A camera module of the mobile device 10 is activated. Through the user's manipulation, the mobile device 10 is directed toward a target to be annotated. The target is such as a building, a shop, a landscape, or an article. Through a screen of the mobile device 10, the user can see a real scene 101 relating to the target. After that, an Augmented Reality (AR) technology can be applied. The user can utilize a touch-sensitive display of the mobile device 10 or other input methods to add a new message onto a region of the real scene 101. The message can be a text, a picture, a video or a sound, or a combination thereof.

This example shows the user standing before a famous attraction, e.g. the Eiffel Tower. The user manipulates the mobile device 10 to point toward the real scene 101, and annotates a note such as 'Eiffel Tower.' This annotation is a spatial object 103 defined by the application system of the present disclosure.

After that, the user is required to confirm the spatial object 103, e.g. the annotation, accompanied by its corresponding spatial information in the real scene 101. The software program executed by the mobile device 10 transmits the data of the spatial object 103 and its corresponding spatial information to a server or a host of the application system.

The spatial object 103 can be any type or any combination of a text, a picture, a video, and a sound. The mentioned spatial information includes a ground-position data, a space-angle data, and image information of the real scene 101 when the spatial object 103 has been created. The space angle can be a combination of an azimuth angle and an elevation angle.

Under a search and display mode, the image information of the real scene 101 indicates the information of color blocks and the lines between the adjacent color blocks with respect to the Eiffel Tower behind the spatial object 103. The ground-position data, the space-angle data, the color block data, and the line data form the parameters for searching the spatial object 103. These data are stored in the cloud-based server of the application system. When the user manipulates the mobile device 10 to generate and upload the spatial information, the cloud-based server obtains the spatial object 103 through a comparison operation. In general, the ground-position data and the space-angle data are the requisite factors for the cloud-based server to obtain the spatial object 103. If necessary, the server continues to compare the color block data and/or line data transmitted by the mobile device 10; or first conducts a comparison using the line data, and then adds the color block data when the spatial object 103 cannot be identified through the line data. In consequence of the process, a search result is transmitted to the mobile device 10.

Further, the mobile device 10 displays the spatial object 103 through an interface initiated by the software program. A link icon can be used to link to further information. The spatial object 103 itself can also be a link button provided for the user to click for more information about the spatial object 103. Further information relating to the spatial object can be provided by the system; or the information can accompany the spatial object when the spatial object is created. In an exemplary example, when the spatial object indicates a link of a scenic spot, its introduction, traffic information, and store location information can be obtained when the link is clicked. When the spatial object indicates a store, further information such as the store's contact information and discounts are provided for the user's reference.

FIG. 1B shows another diagram illustrating circumstances for creating the location-based spatial object in one embodiment of the present disclosure. The user operates the mobile device 10 to initiate the software program. Under a data establishment mode, the camera module is activated. When the mobile device 10 is facing toward a scene 102, a building for example, the system allows a spatial object 105 to be overlapped over several floors of the building precisely by an AR technology. The spatial object 105 is a picture in this example, and the picture conveys the information relating to the floors covered or about this scene 102.

For example, if a company is located at the floors directed at by the mobile device 10, the spatial object 105 can be the text, video, and/or picture introducing the company, or even the company's product advertisement or recruitment information. When the company annotates this spatial object 105, the spatial information relating to this spatial object 105 is transmitted to the server. The spatial information not only includes the image data of the spatial object 105, but also the ground-position data and the space-angle data of the mobile device 10, and the image information of the real scene 102 when the spatial object 105 is made. The image information of the scene 102 indicates the color block data and the line data between the color blocks of the background of the spatial object 105 when the spatial object 105 is made.

When the spatial information with respect to the spatial object 105 has been established, the ground-position data, the space-angle data and the image information for the spatial object 105 are transmitted to the application system, and act as the parameters stored in a database for searching for the spatial object 105 in the future.

Further, when creating the spatial object 105, the user can render it with more functions such as defining a URL link to the spatial object 105 that allows others to acquire more information when the spatial object 105 is searched for. The URL may direct to a webpage rendering an interface allowing the user to receive more interactive services such as conducting a video conference, a message conversation, or online shopping.

FIG. 1C schematically shows circumstances depicting one of the embodiments of the present disclosure.

In the diagram, an indoor table is shown in a real scene 104. A mobile device 10 is utilized to capture an image of the real scene 104. Via a program interface, a spatial object 107 is selected and overlapped to the real scene 104. The example shows that a vase is added on the table. Some other types of messages such as a text, a video, a picture, or a combination thereof may also act as the spatial object. Similarly, the software program executed in the mobile device 10 transmits the spatial information with respect to this spatial object 107 to the server when the user has confirmed the position of the spatial object 107. The spatial information exemplarily includes the image of the spatial object 107, its corresponding ground-position data, space-angle data, and the image information of the real scene 104.

It is worth noting that the mobile device 10 may not easily acquire the GPS signal when encountered with an indoor real scene 104. In an example, the proprietary software program of the mobile device 10 can adopt the latest positioning information from the GPS module of the mobile device 10. The latest positioning information helps the application system estimate the position of the mobile device 10. For example, the mobile device 10's latest positioning information helps the software program locate the mobile device 10 if it is in a building or any area where the device cannot receive the GPS signal. However, even though the software program can estimate the position of the mobile device 10, the program cannot accurately locate the mobile device to find any spatial object. Hence, an accurate positioning technique is used by the software program of the present disclosure, in which the image information of the real scene captured by the camera module of the mobile device 10 is adopted as a reference for positioning. In one embodiment of the present disclosure, the image information can be a color block data and/or a line data associated with the real scene where the spatial object is positioned.

According to one of the embodiments, the real scene is usually a background image with respect to an added spatial object. Reference is made to FIG. 1C. A software program executed in the mobile device 10 processes the image of a table surface so as to form a color block data and a line data. A powerful cloud-based server may directly recognize the image and the image information that is used to precisely locate the spatial object. Preferably, the image information with respect to the image of the table surface can be simplified to be a digital form that can be easily stored and used. Regardless of the computational capabilities of the server, rather than applying image recognition to the image, the digital message of the image can be utilized by the system in the pre-processing step to provide a fast searching service. The digital message of the image of the real scene provides sufficient information to expedite the searching service for accurate searching of the corresponding spatial object.

In other words, at the server end, an operation procedure is performed to locate the spatial object according to the ground-position data and space-angle data. In an example, a Global Positioning System (i.e., GPS) installed in the mobile device is used to acquire the ground-position data; and a Gyroscope in the mobile device is utilized to obtain the space-angle data such as a combination of an azimuthal angle and an elevation angle of the mobile device. Moreover, under the search and display mode, the server will compare the image information such as the color block data relating to the real scene if the ground-position data and the space-angle data fail to accurately locate the spatial object. Still further, the server may use the line data to assist the searching process if the color block data is insufficient to locate any spatial object. The application system consequently provides a search result including at least one matched spatial object, or provides options to select from.

The ground-position data is generally read out from a positioning circuit, e.g. a GPS module, in the mobile device. The positioning data can also be obtained from other auxiliary positioning signals such as the signals from mobile stations or a wireless local area network. In an example, when the mobile device is located at a place where it cannot receive GPS signals, the application system regards the latest received positioning signals as the ground-position data other than incorporating the auxiliary positioning signals. Next, the application system receives the signals generated by a space-positioning circuit, e.g. a gyroscope, in the mobile device, and the signals form the space-angle data.

Figure 2A:
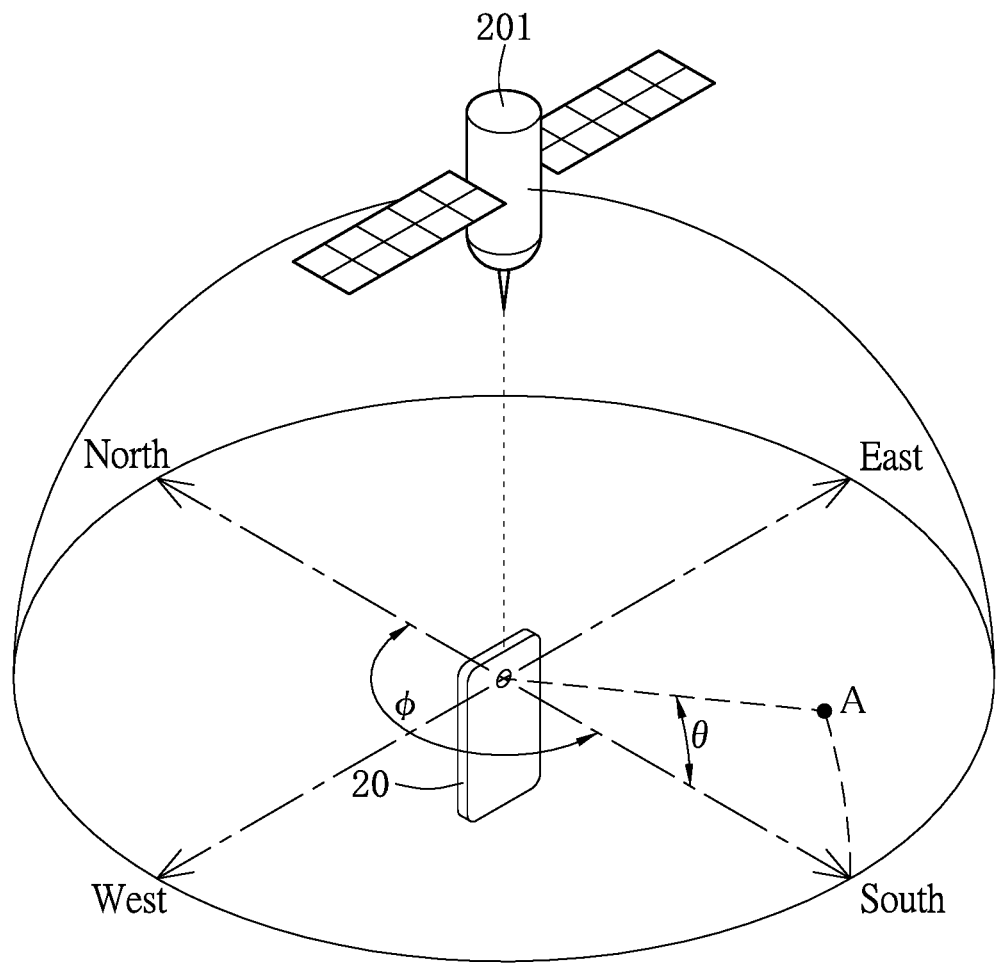
FIG. 2A shows a schematic diagram depicting coordinates indicating a space-angle data.

The schematic diagram shown in FIG. 2A depicts the formation of the space-angle data. A spatial coordinate system can be exemplarily defined by a pair of an azimuth angle $\varphi$ and an elevation angle $\theta$. The azimuth angle $\varphi$ is especially an angular measurement of a spherical coordinate system. In one aspect of the present disclosure, the mobile device 20 renders the spatial coordinate system. An origin of the spatial coordinate system indicates a position where the mobile device 20 held by the user, e.g. an observer, is located. The horizontal plane develops the spherical coordinates for defining the azimuth angle $\varphi$ ranging from 0-degree angle (direction of North), 90-degree angle (direction of East), 180-degree angle (direction of South), 270-degree angle (direction of West), and to 360-degree angle (back to direction of North). The azimuth angle can be described based on a reference axis, e.g. the North axis, for defining an azimuthal direction of the mobile device 20. For example, the direction A that a rear camera of the mobile device 20 points toward indicates the azimuthal direction. This direction A constitutes the azimuth angle $\varphi$ and the elevation angle $\theta$. Both the azimuth angle $\varphi$ and the elevation angle $\theta$ can be determined by a space-positioning unit in the mobile device 20. A combination of the azimuth angle $\varphi$ and the elevation angle $\theta$ forms the space-angle data for this direction A. When this space-angle data is combined with the ground-position data generated in the mobile device 20 through the positioning satellite 201, the mobile device 20 can be positioned by its position and pointing direction. A kind of spatial information is therefore formed. The spatial information is provided to the application system for obtaining a spatial object that is displayed on the mobile device 20 through an operation procedure.

Figure 2B:
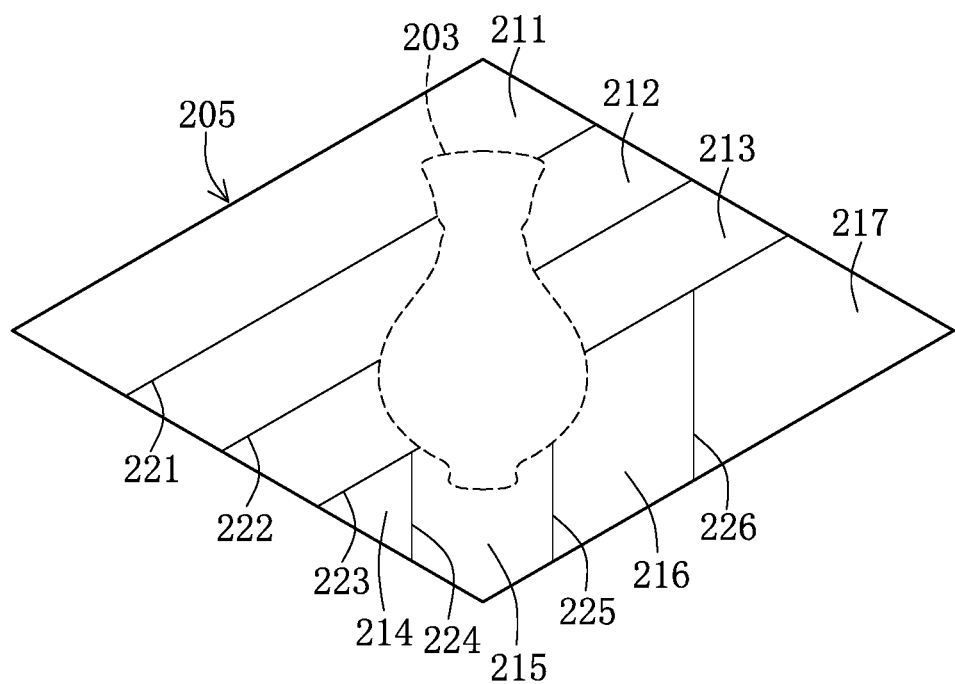
FIG. 2B shows a schematic diagram retrieving image information relating to a background of the spatial object.

FIG. 2B shows a schematic diagram depicting a technique to obtain the image information with respect to a spatial object. A spatial object 203 indicated by a dotted-line frame in the diagram is positioned over a background image 205. When the spatial object 203 has been created, the server acquires information relating to the spatial object 203 from the mobile device at the user end. The information relating to the spatial object 203 includes an image of the spatial object 203, and its positioning information such as a ground-position data and a space-angle data. The image information of the background image 205 can also be acquired by the server. The positioning information, optionally with the image information of the background image 205, constitutes the parameters of spatial information for locating the spatial object 203. Further, more information can be annotated to the spatial object 203. For example, a hyperlink can be annotated to the spatial object 203 that allows a user to acquire further information when he/she searches the spatial object 203. The hyperlink is clickable to link a webpage or a shopping interface for further interaction.

The image information of the background image 205 can be composed of a color block data and a line data through an image processing process. In one embodiment, the image processing process can be performed using a software program executed in the mobile device, or in the cloud-based server. The image processing process extracts the characteristics such as the color blocks and the lines therebetween from the background image 205. Both the color blocks and the lines act as the parameters for locating the spatial object.

In an exemplary example, the pre-processing method first sketches the background image 205, for example, using the lines 221, 222, 223, 224, 225, and 226. The blocks 211, 212, 213, 214, 215, 216, and 217 are formed by the lines 221, 222, 223, 224, 225, and 226. After that, an average of the pixel values in every block can be computed. The average denotes a color block data with respect to every block. In one further embodiment, a normalization method can be performed onto the pixels of every block so as to compute every block's characteristic value. The characteristic value is regarded as the block's color block data. It is noted that the image pre-processing method is not limited to the above disclosure. The image under the pre-processing method is not limited to be within any specific chromatic space, but it can be within an RGB space, a HSV (Hue, Saturation, and Value) space, or a CMYK (Cyan, Magenta, Yellow, and Black).

It is worth noting that, the information relating to the lines 221, 222, 223, 224, 225, and 226 for the background image 205 conveys a line data that acts as the reference for displaying the spatial object 203. Through the image processing process, the spatial object 203 can be positioned on the plane just as it should be placed.

Figure 3:
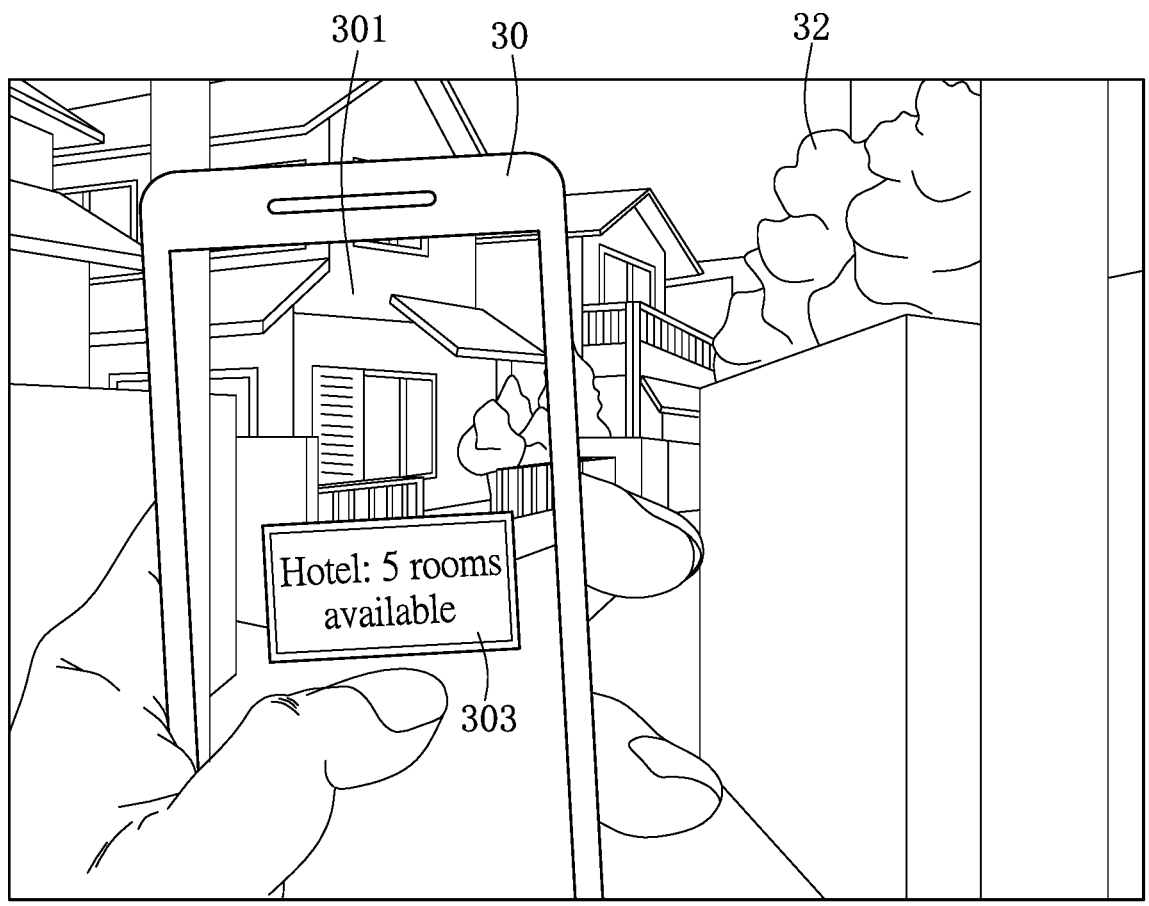
FIG. 3 shows a schematic diagram depicting a user using a mobile device to search the spatial object.

Reference is made to FIG. 3 showing a user operating a mobile device to search a spatial object.

A mobile device 30 is such as a user's mobile phone, or tablet computer. The device for conducting the searching ranking can also be intelligent glasses, AR/VR glasses, or any type of portable electronic device. In one aspect of the present disclosure, the mobile device 30 retrieves the spatial object, e.g. a message 303, associated with the location and space from the cloud system while displaying a real scene image 32 on a display 301 of the mobile device 30.

In an example, a user carries the mobile device 30 to a location, and the system confirms that there is a message for the user due to the current location of the mobile device 30. The message can be designated to a specific user, the general users, or the message the users are interested in, or the message can be a personal message for an individual user. The system can utilize a notification message or other ways such as vibration and sound to notify the user that there is a viewable message nearby. While the user is notified, the user operates the mobile device 30 to move in a space for searching a spatial object. The moving mobile device 30 around the space renders a movement of azimuthal angle over a horizontal direction, and another movement of elevation angle over a vertical direction. Reference is made to FIG. 2A, which shows the spatial information delivered to the cloud system. The cloud system returns a spatial object corresponding to the spatial information after a comparison process. Next, a software program executed in the mobile device 30 is initiated to gain the auxiliary positioning information from the image of the real scene 32, and transmit the information to the cloud system. An augmented reality technology is utilized to overlap the spatial object obtained from the cloud system with the real scene 32. In the current example, the spatial object such as a virtual message 303 displayed on the display 301 indicates that five rooms are available at the hotel.

Figure 4:
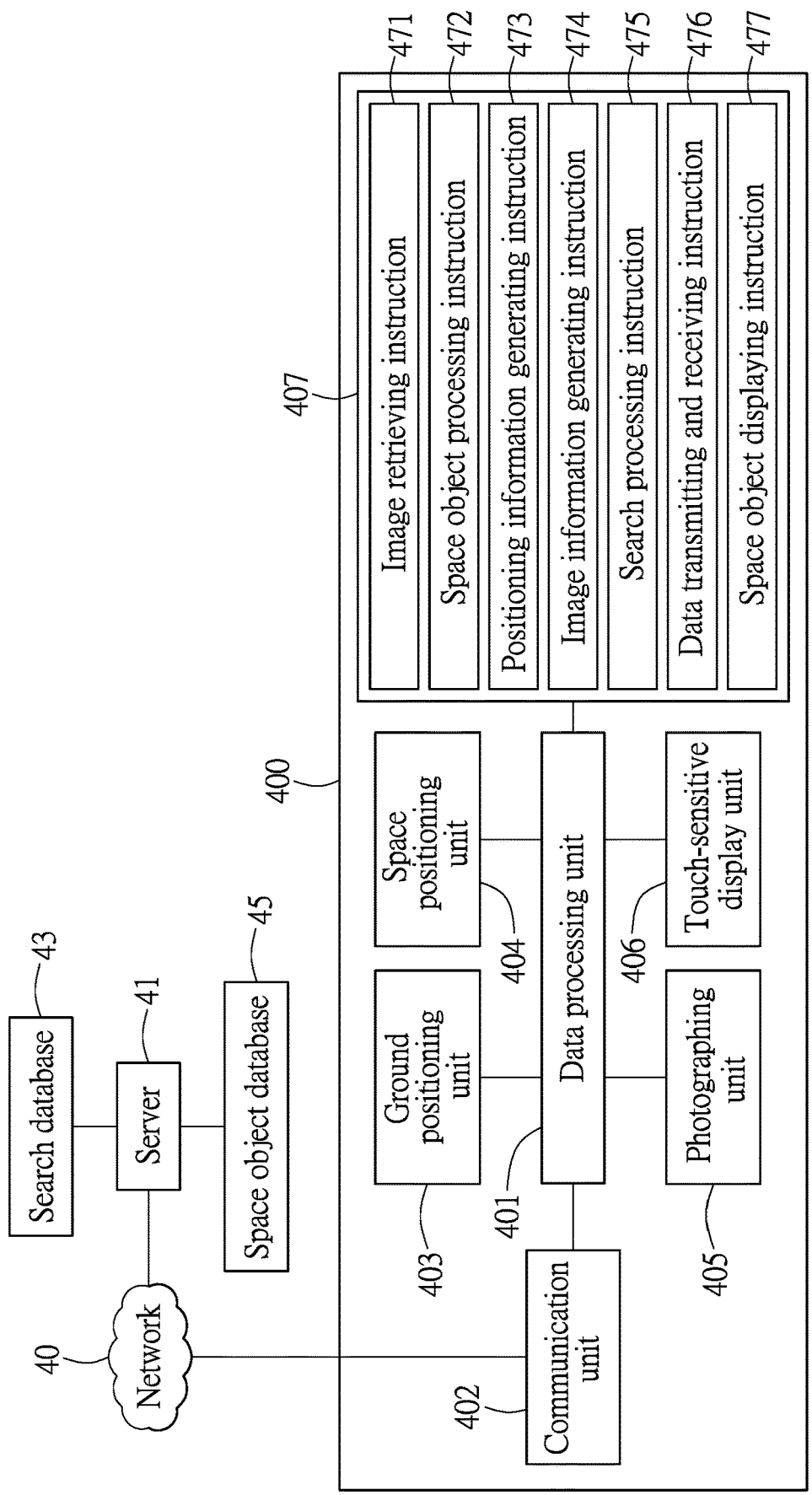
FIG. 4 shows a diagram describing hardware and/or software-implemented modules in the mobile device used to search the location-based spatial object in one embodiment of the present disclosure.

FIG. 4 shows a diagram depicting the software modules of the mobile device operating the method for searching location-based spatial object in one embodiment of the present disclosure.

The application system includes a cloud-based server 41. The server 41 is implemented by a computer system, or a cluster of multiple computer systems for operating various functions. The server 41 is mainly used to receive the data of a spatial object and corresponding spatial information uploaded by the user-end mobile device 400 so as to establish a database. Establishment of the database can be based on a search database 43 and a spatial object database 45. The database is used to record the data generated by the user-end mobile device.

The database is such as a data storage medium that can be separated into the search database 43 and the spatial object database 45. Both the databases 43 and 45 can be installed into one server, or different sites. The spatial object database 45 mainly records the data of the spatial object uploaded by the mobile device 400. The spatial object can be any type or any combination of a text, a picture, a video, and a sound. The video may comprehensively include a plane graphic animation or a 3D animation. The spatial object database 45 simultaneously acts as the source provided for the user to search for the spatial objects using the mobile device 400. The search database 43 mainly records further information relating to the spatial object uploaded by the mobile device 400. The information is such as the positioning information with respect to the spatial object, and/or including the color block data and the line data corresponding to the scene where the spatial object is positioned. The color block data and the line data extracted from the real scene relating to the spatial object act as the reference for locating the spatial object. The server 41 performs an operation procedure of comparison using the spatial information recorded in the search database 43. One or more spatial objects can be found in this preliminary procedure. Every spatial object has its identification that is delivered to the user-end device.

Furthermore, when the spatial information relating to the spatial object is formed by the user operating the mobile device 400, the searching criteria is also generated. The searching criteria such as a time range, a viewable range, and/or a user range are configured to be uploaded to the search database 43.

For example, a spatial object is established in a place correlated to a real scene, and a time range can be set. The time range acts as one of the searching criteria. The time range confines the user to merely search for the spatial objects within a time period in which the seeable spatial objects also meet the other searching criteria, such as the conditions including the positioning information and image information. The viewable range confines a seeable distance from the real scene, a viewable plane-position range and/or a viewable space-angle range allowing the user to see the spatial object. The user cannot see the spatial object until the mobile device 400 held by the user moves within the viewable range.

Further, the user range allows the user to confine who can see the spatial object. The number of the users who are allowed to see the spatial object is configurable, e.g. one or more people. Every user's identification (user ID) will be transmitted to the server 41 when the user operates the mobile device 400 to search for the spatial object. This user ID is one of the searching criteria.

The application system establishes the database, e.g. the search database 43 and the spatial object database 45, using a mass of data uploaded by a plurality of users. A search engine is therefore established, and renders a search service for the user operating the mobile device to search for the spatial objects.

The mobile device 400 is configured to operate the method for creating the location-based spatial object, and also for displaying the spatial object. The mobile device 400 connects to the server 41 over the network 40. The mobile device 400 includes the main circuit components such as a data processing unit 401 that is used to process the signals among the circuit components of the mobile device 400, and the other circuits electrically connected to the data processing unit 401. The mobile device 400 includes a communication unit 402 that is used to establish a connection to an external device. A ground-positioning unit 403 in the mobile device 400 is used to sense the position of the mobile device 400. A space-positioning unit 404 is used to sense the spatial position of the mobile device 400. A photographing unit 405 is for capturing the image of a real scene. A touch-sensitive display unit 406 allows the user to input commands using gestures.

The ground-positioning unit 403 can be implemented by the circuit component of a global positioning system that utilizes positioning signals received from a positioning satellite to generate ground-position data. The positioning scheme can be collaborated with the signals generated by other wireless base stations. The space-positioning unit 404 can be implemented by a gyroscope in the mobile device 400. The gyroscope is used to sense the spatial position of the mobile device 400 in a 3D space, so as to generate a space-angle data essentially constituted of an azimuth angle $\varphi$ and an elevation angle $\theta$. It is noted that the space-angle data and its range are established by associating to the real scene's ground-position data.

The application system includes a memory unit 407 inside the mobile device 400. The memory unit 407 is such as a non-transitory computer-readable medium that is used to store an instruction set. The instruction set executed by one or more processors of the mobile device 400 is to perform the sequences for creating and displaying the location-based spatial object. The main sequences of the instruction set are as follows.

First, an instruction (471) is initiated to activate a photographing unit 405 of the mobile device 400 for capturing an image of a real scene. The real scene is displayed on the mobile device 400. An instruction (472) is used to process a spatial object created in the real scene by a user using a touch-sensitive display unit 406 of the mobile device 400. The spatial object can be positioned at the front, rear, top, bottom, left or right sides of the real scene. The spatial object can be freely created by the user, or selected from the spatial object database 45 of the system. The spatial object is transmitted to the server 41 in a form of any one or a combination of a text, a picture, a video, and a sound. An instruction (473) receives the signals made by a positioning circuit of the mobile device 400. For example, the signals are generated by a ground-positioning unit 403 and a space-positioning unit 404 of the mobile device 400, and form the positioning information for locating the mobile device 400. An instruction (474) is initiated to process the image of the real scene. The image information of the real scene is such as a color block data and a line data that are used to locate the spatial object. An instruction (475) allows the server 41 to receive the positioning information and the image information generated by the mobile device 400 under a search and display mode and afterwards to produce a search result. An instruction (476) is initiated to establish a connection between the mobile device 400 and the server 41, and is used to transmit and receive signals over the connection. The instruction (476) is performed to transmit the positioning information, especially the image information, to the server 41, and receive the search result therefrom. An instruction (477) allows the mobile device 400 to display the spatial object according to the search result provided by the server 41. The spatial object displayed on the mobile device 400 can be overlapped to the real scene.

It should be noted that the spatial object can be provided by a system that provides an image library, a video library, and/or a sound library; further, the system allows the user to create/upload the spatial object using some software tools; or the spatial object can be a picture photographed by the user.

Figure 5:
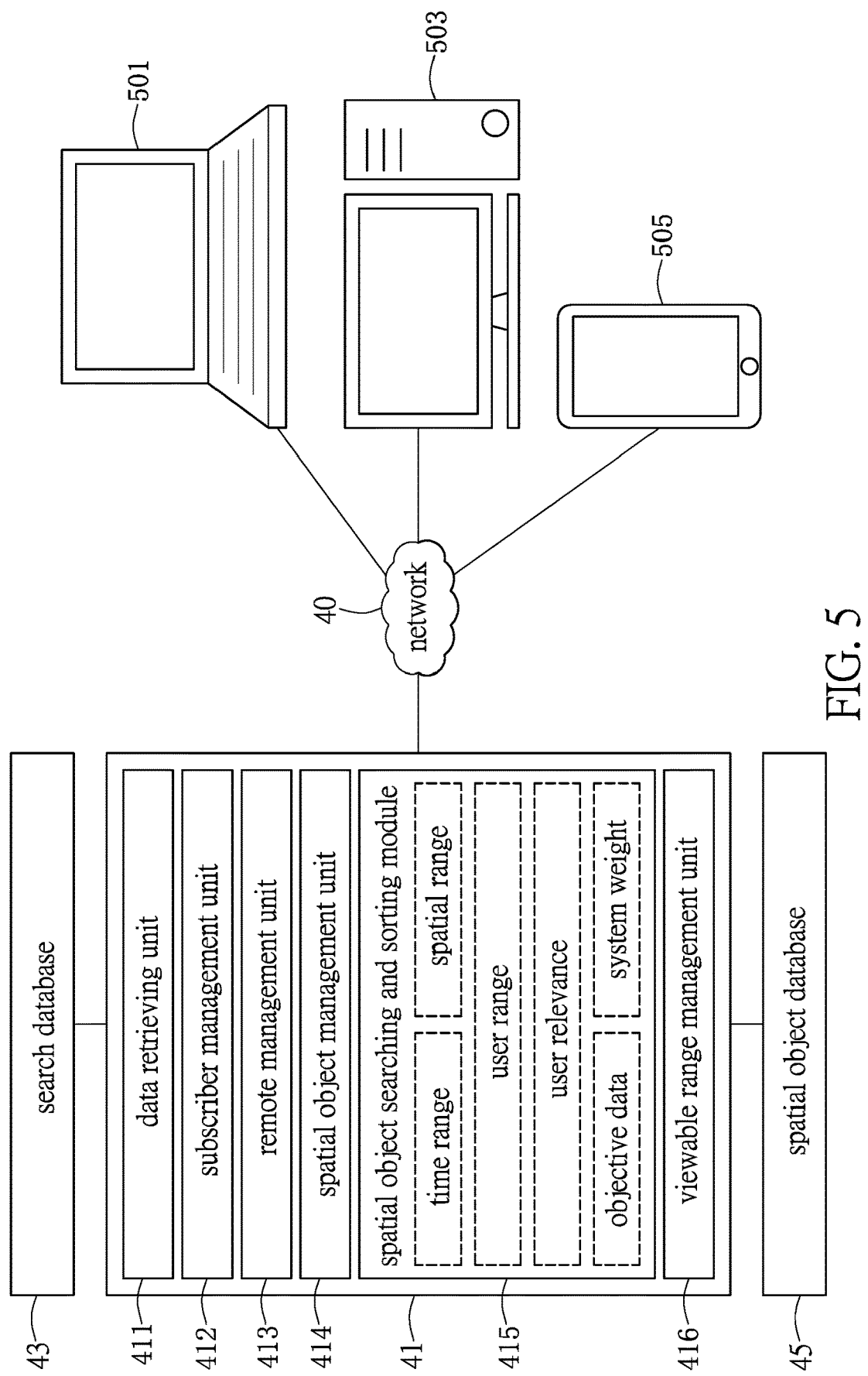
FIG. 5 shows a schematic diagram describing functional modules of a server of the system for managing viewability of location-based spatial object according to one embodiment of the present disclosure.

FIG. 5 shows a diagram of functional modules of a server of the system for managing viewability of a location-based spatial object according to one embodiment of the present disclosure. The server embodies a cloud system that is implemented by hardware or with software. The cloud system includes a search database 43 that records multiple spatial objects, with each spatial object corresponding to one set of spatial information, e.g. ground-position data, space-angle data, or adding the information of color blocks and lines. Every spatial object has an ID acting as an index for searching. Every spatial object further corresponds to individual search criteria. The search criteria include at least one selected from a time range, a viewable range, and a user range. The viewable range is such as a horizontal angle and an elevation angle. The user range indicates a group of users who are designated to see the spatial object.

The spatial object database 45 of the system is used to store data relating to the spatial object. The spatial object is stored in the database in a specific form such as a text, a picture, a video or a sound, or a combination thereof. The ID of the spatial object acts as an index to link spatial information and search criteria of the search database 43 for the specific spatial object.

A server 41 is a computer system with operations implemented by the hardware and software and including one or more processors for performing the services allowing the subscribers 501, 503 and 505 to conduct viewability management of the location-based spatial object over a network 40. The server 41 is used to process the spatial object and its spatial information made by the subscribers 501, 503 and 505.

The server 41 includes a data retrieving unit 411 that is a circuit-based solution to achieve data retrieval. For example, a network interface of the server 41 is utilized to link to the network 40 for receiving the spatial object set up by one of the subscribers, and the spatial information and search criteria of the spatial object. The spatial information includes the positioning data and the information relating to a real scene. The data retrieving unit 411 initially processes the information for establishing data for searching the spatial object.

A subscriber management unit 412 is used to manage the subscriber of the system using a memory and a set of computer instructions. The memory is used to store the subscribers and every subscriber's security data such as identification data and password. The system uses those data to establish a database for the subscribers.

A remote management unit 413 is implemented by a service program. The remote management unit 413 links to a front-end user interface and a back-end database (43, 45). The remote management unit 413 renders a user interface provided for the remote subscriber to set up the spatial object and the related content. The remote management unit 413 allows the subscriber to conduct the remote management by a specific program, e.g. a web browser or a proprietary program. The user interface initiated by the remote management unit 413 provides the subscriber with the option to upload the spatial object and the spatial information relating to the place where the spatial object is positioned. It is noted that the spatial object is a text, a picture, a video or a sound, or a combination thereof. The user interface renders an electronic map allowing the subscriber to select a place to set up the spatial object. The spatial information includes a space range allowing the users to see the spatial object. The space range indicates a ground position range and a space angle range. A set of search criteria such as a time range and a user range can also be provided to confine the viewable range of the spatial object. The time range denotes a validity period, and the user range denotes one or more viewable users.

A spatial object management unit 414, coupled to the remote management unit 413, is used to receive the spatial object and its corresponding content such as the spatial information (positioning information, image information) and search criteria. The spatial object management unit 414 creates a spatial object ID associated with the spatial object that can be linked to a specific subscriber ID. The subscriber ID is used to identify the subscriber. The various types of spatial objects are stored in the spatial object database 45. The information relating to the spatial object is recorded in the search database 43. The information in the search database 43 includes ground-position data, space-angle data, image information relating to the real scene, and search criteria associated with each spatial object.

In one embodiment, the system may utilize different servers to perform different works. For example, the server 41 provides remote management services for the location-based spatial object. The system may utilize another server to conduct a searching service for searching the spatial object, in which a spatial object searching and sorting module 415 embodies the function of searching the spatial object.

The spatial object searching and sorting module 415 is used to process the search criteria corresponding to the spatial object which the user wishes to search, and to process ranking criteria of the spatial object. The mentioned search criteria are such as a time range, a viewable range (the range covering a horizontal angle and an elevation angle), and/or a user range. The ranking criteria relate to a time factor, user relevance, objective data, and a system weight associated with the spatial object.

The spatial object searching and sorting module 415 is also in charge of communicating the system-end service with the software program of a user-end mobile device. A service sequence is used to receive the searching information generated by the mobile device and output a search result of spatial objects. In one embodiment, the service sequence compares the positioning information uploaded by the mobile device with the data in the search database 43. The system retrieves the spatial object data from the spatial object database 45 according to the search result. The spatial objects related to the search result are transmitted to the mobile device. Further, a ranking may be performed upon the search result in order to prioritize relatively interesting content to the user.

The ranking process introduces filtering criteria for the search result having multiple spatial objects. The filtering criteria such as ranking weights cause the search result to be narrowed to a certain number of spatial objects. The ranking of the search result can be adjusted according to the ranking weights of the spatial objects and make the search result more meaningful.

In an example, the spatial object searching and sorting module 415 is operated to sort the spatial object according to user relevant information. The user relevant information is such as a user ID associated with the spatial information. The user relevant information is retrieved by the system. The system accordingly acquires the spatial object which is designated to be viewable for a specific user or a user range. The spatial object is set up to be a personal spatial object through filtering with the user ID. The personal spatial object can be configured to be viewable only to the one or more viewable users having priority ranking. On the contrary, users being excluded outside of the user range will not be able to see the spatial object. Therefore, the system allows the subscriber to set up the spatial object to be unavailable to certain users.

Further, the user relevant information can be a preference or historical data of the user. Still further, in the database, one or more content categorizations for the spatial object can be set via the remote management interface. The user sets up the preference in the system. The user can actively set up one or more content categorizations in the preference. The historical data includes the data related to the user collected by the system. For example, the historical data records a stay time and number of visits for the content associated with the spatial object. The system may regard the category of the content receiving longer stay time from the user as a preferred category. Similarly, the number of visits for the content of the spatial object can be used as a reference to judge the user's preference. The cloud system determines one or more preferred content categorizations according to the user's historical data.

The system prioritizes spatial objects with higher relevance to the user, and deprioritizes spatial objects with lower relevance to the user. The system accordingly provides a search result with a relevance ranking.

In one embodiment, the spatial object has a time property. A spatial object provider is permitted to set up a time factor for the spatial object. The time factor can be an available time period to show the spatial object. The available time period can be a time range or a period of time, e.g. in the morning, at the noon time, or in the evening. The available time can be an available display time period to be searched. The system filters a preliminary search result according to a system time of the server in order to exclude the spatial objects that do not match the time factor. For example, the spatial objects not within the display time period are excluded from the search result; and the spatial objects that expire prior to the system time are also excluded.

The system may sort the spatial objects according to objective data. The objective data is such as a time of creation, an update time/rate, an available time period, a click through rate, and/or user reviews associated with every spatial object. The system decides a ranking of a sorting result based on these objective data. For example, the spatial object gains higher priority when it has a later time of creation; the spatial object gains higher priority when it has a higher updating rate; the spatial object gains higher priority when it has a higher access rate; or the spatial object gains higher priority if it gains higher reviews for its content.

Moreover, in addition to the above-mentioned time, user relevance, and the objective data used as reference for sorting, the system can impose a system weight to every spatial object in the database. The system allows the spatial object provider to assign a weight to every spatial object. The system calculates a system weight for every spatial object according to its individual weight, and the spatial object with higher system weight gains higher ranking.

In an example, the system weight can be an advertisement. The spatial object provider can be an advertiser. The advertiser can offer a price to request a higher priority ranking for his spatial object. The price becomes one of the system weights. The system changes the ranking of the spatial objects through the system weights. The spatial objects relating to government publicity activities or public information can also be prioritized by manipulating the system weights thereof.

The system weight forms a ranking weight for the spatial object. The spatial object is given a value. For example, the provider of the spatial object can be an advertiser who gives a price to ask the system to provide a higher ranking for the spatial object. The ranking weight acts as a basis to render the display order when the overlapped spatial objects are searched under the same searching criteria. It is noted that there are some circumstances that the ranking weight can be incorporated to affect the display order since the spatial object is a government decree, an emergency event or any information the public concerns.

Through the spatial object searching and sorting module 415, a ranking can be decided based on the various references of ranking. The ranking scenario is adjustable according to actual needs.

At last, the system delivers a result of searching and sorting to the mobile device which issued the request. The mobile device uses its display to show a spatial object with the highest priority when the mobile device receives one or more spatial objects from the server 41. Further, the mobile device shows a selected spatial object according to a selection instruction. The spatial object shown in the display of the mobile device is combined with the real scene captured in the beginning.

The server 41 utilizes a viewable range management unit 416 to set up the time range, the spatial range and/or the user range in the spatial object searching and sorting module 415. The system initiates a user interface that is exemplified as the schematic diagrams shown in FIGS. 8A through 8C and FIGS. 9A through 9D. The configurations associated with the spatial objects are stored in the database, in which the spatial objects form the content in the spatial object database 45, and also the searching criteria recorded in the search database 43.

Figure 6:
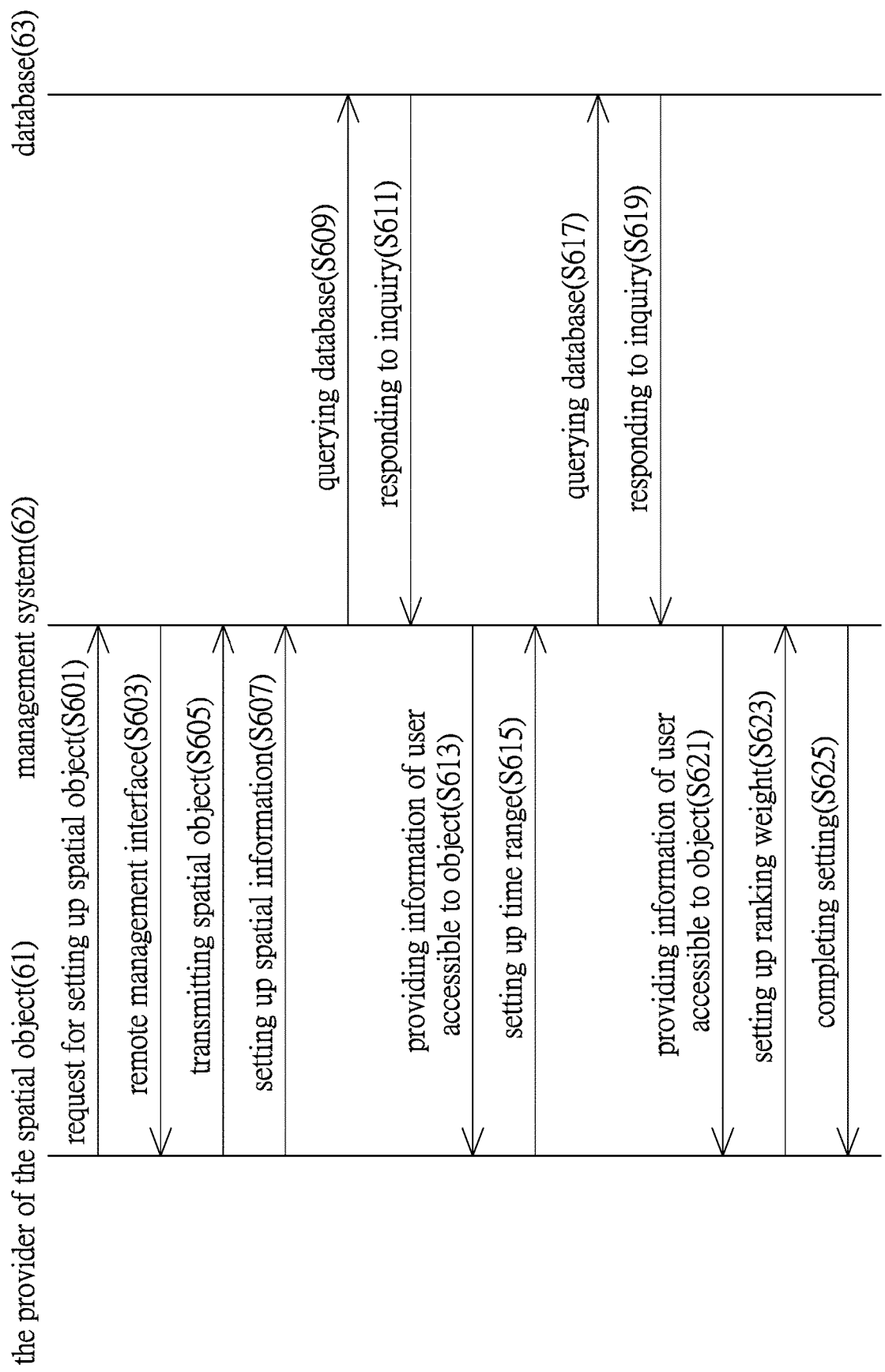
FIG. 6 shows a flow chart describing the method for managing viewability of location-based spatial object in one embodiment.

Reference is next made to FIG. 6 showing a flow chart describing the method for managing viewability of the location-based spatial object in one embodiment of the disclosure. The steps in the method are operated in a server provided by the management system 62. The server includes one or more processors for performing the process for managing the viewability of the location-based spatial object.

In the beginning, such as in step S601, a provider 61 of a spatial object, e.g. a subscriber of the system, requests a service of setting up the spatial object to the management system 62. Next, such as in step S603, the management system 62 renders a remote management interface.

In one embodiment, the remote management interface can be in form of a user interface rendered by a web browser. The remote management interface can be implemented by a script language that initiates an interface for accessing a database. The interface allows the subscriber to conduct remote management using a web browser. The remote management interface can be implemented by proprietary software provided by the system. After a security authentication for the subscriber, the subscriber manipulates the remote management interface using a computer system. The subscriber can set up one or more spatial objects including their details at one or more locations through the remote management interface. For example, a viewable range corresponding to one spatial object can be made. The viewable range covers a spatial range, a time range and a user range.

The provider 61 of the spatial object uploads content of the spatial object, such as in step S605. The system receives the spatial object and its information uploaded by the subscriber through the remote management interface. The types of the spatial object supported by the system can be a text, an image, a video or an audio, or any combination thereof.

Next, in step S607, the provider 61 of the spatial object sets up spatial information for disposing the spatial object through the remote management interface, for example a ground-position data can be made. In one embodiment, the remote management interface may render an electronic map allowing the provider 61 to indicate a geographic location to dispose the spatial object. In the meantime, the remote management interface may render a real image that directs to a street view corresponding to the ground-position data. The street view allows the provider 61 to decide a real scene to dispose the spatial object more intuitively. The spatial object associates with a spatial-angle data that is a combination of an azimuth angle and an elevation angle. The management system 62 computes a spatial range that acts as one of searching criteria for searching the spatial object according to the environmental factors such as a geographic location, a building, or any fixed object in the environment. The ground-position data and the spatial-angle data form the spatial information of the spatial object.

In step S609, the management system 62 queries the database 63 based on the ground-position data. Some other spatial objects relating to the spatial information of the spatial object can be found out. The information of the potential users who can access the spatial object can be obtained. The information of the potential users is such as a number of the users, an age distribution, or genders. The information of the potential user further includes user information whose attribute is associated with the spatial object. The attribute of the user can be the user's preference and historical data. The system 62 receives a search result from the database 63, such as in step S611. The management system 62 then transmits the information of the users who has high possibility to access the spatial object to the provider 61, such as in step S613.

In step S615, if it is necessary, the provider 61 of the spatial object can continue to set up searching criteria, e.g. a time range. The management system 62 receives the searching criteria. The system 62 queries the database 63, such as in step S617, so as to obtain the user information about the users who can access the spatial object in the time range. In step S619, the information is responded to the system 62. The information may show other spatial objects that interfere with the spatial object under the same searching criteria with a specific spatial range and time range.

After that, the management system 62 delivers the information regarding the potential users under the searching criteria to the provider 61, such as in step S621. The processor of the server of the management system 62 computes a viewable range including the spatial range and the time range that confine the users who can access the spatial object. In one further embodiment, the provider 61 of the spatial object may further set up an age range to narrow the users with a certain range of age, for example the old age, the middle age, the youth, or the teenager; or a gender range to confine the potential users to be males, females, or both.

When the provider 61 of the spatial object obtains the information of the potential users from the management system 62, some interferes with other spatial objects may be found. In step S623, the provider 61 can set up a ranking weight to affect a display order of the spatial objects in a search result. For example, the provider 61 can give a price applied to his/her spatial object for having higher display order when some other spatial objects exist under the same search criteria. Finally, the management system 62 completes the setting after the provider 61's confirmation. In a final step S625, a location-based spatial object file is created.

According to one of the embodiments, the database 63 is used to record the data collected within a period of time. The data in the database 63 is such as a number of people who passes a location, an age distribution of the people, genders of the people, and their interests, educations and works. Further, the data in the database 63 can record the information of the people who are in different times, dates, and weathers. After data analysis, the data renders a reference for the provider 61 to set up the spatial object.

It should be noted that, in the step S615, the system allows the provider 61 to set up a searchable time range applied to the spatial object, and the time range is such as a validity period for a special program by a store; the provider 61 can set up the spatial object to be seeable at a daily shop time of the store; the provider 61 can set up the various searching criteria with daily, weekly or monthly time range.

Figure 7:
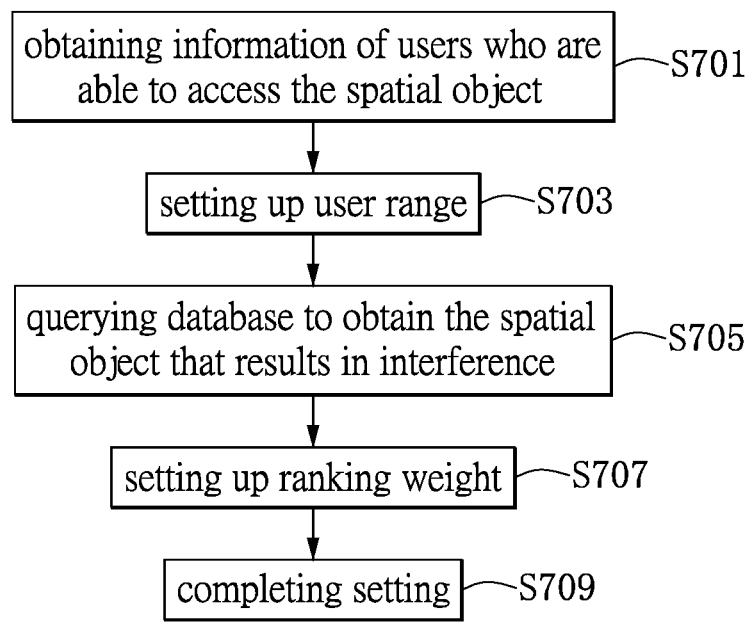
FIG. 7 shows another flow chart describing the method for managing viewability of location-based spatial object in another embodiment.

The provider of the spatial object acquires a statistical data of the potential users who can access the spatial object when he obtains the user information under specific searching criteria about time and space. The provider can set up any user who is specified to see the spatial object. Reference is made to FIG. 7.

The provider of the spatial object, e.g. a subscriber of the system, can instantly obtain the information of potential users who can access the spatial object under various searching criteria by the management system, such as in step S701. The information of the potential users may include number of the users, an age distribution thereof, and genders. The system allows the subscriber to choose the qualified users who can access the spatial object through the information. The management system allows the subscriber to set up a user range of the users in addition to setting up the spatial range and the time range, such as in step S703.

Thus, the subscriber of the system sets up the user range through the remote management interface. The user range is used to confine any or a combination of an age range, gender, education and interest of the users who are able to access the spatial object. The interest of the users is obtained by analyzing the historical data of the users. When the spatial object is a kind of advertisement, the system can achieve accurate marketing.

In addition to obtaining the information of the potential users who can access the spatial object by querying the database using specific searching criteria, the subscriber can also specify one or more users to see the spatial object. For example, the subscriber can specify one or more user IDs, or the users in one or more group IDs able to search/see the spatial object.

Similarly, the management system can find out other spatial objects that interfere with the present spatial object even though the subscriber sets up the user range. In step S705, the other spatial object that results in interference can be obtained by querying the database. In step S707, the subscriber sets up the ranking weight that affects a display order through the remote management interface. For example, the display order of the spatial object can be changed if the subscriber agrees to pay a price. The price forms a price factor of the system for obtaining higher ranking. The system then completes the setting, such as in step S709.

The following diagrams schematically show how the management system allows the subscriber to set up the spatial object when it meets the interference with other spatial objects.

Figure 8A:
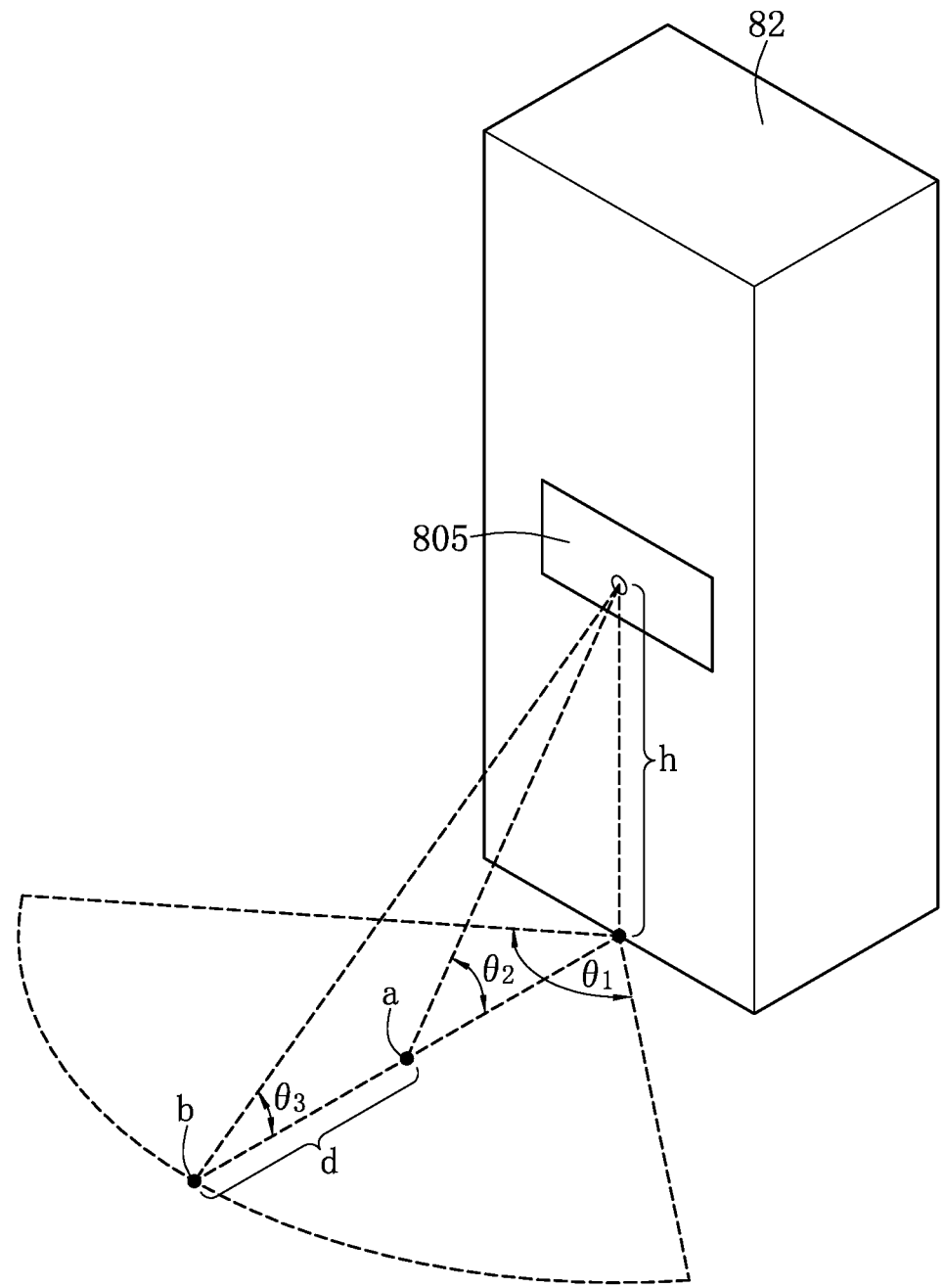
FIG. 8A shows a schematic diagram depicting setting up a spatial object and the spatial information with its viewable range in one embodiment.

FIG. 8A shows a schematic diagram depicting a spatial object and a viewable range of the spatial object in one embodiment.

A spatial object 805 attached to a real scene 82 is provided. When the spatial object 805 is managed through the remote management interface of the system, several information are required to be given. The subscriber is required to set up a position to dispose this spatial object 805 in the real scene 82. The information relating to this position is such as an area, including position and size, covered by the spatial object 805. The area occupied by the spatial object 805 allows the user to choose by using a computer mouse or a touch gesture. In the step of determining the spatial information of the spatial object 805, the position and the size of the spatial object 805 is required to be set up and configured to be attached to the real scene 82.

The system simultaneously obtains background image information once the spatial object 805 has been set. The server of the system will process the real scene image by an image processing process for determining the background image. The background image renders a color-block data and a line data for positioning the spatial object 805 through the image processing process. When the background image acts as the positioning information of the spatial object 805, the user can later search this spatial object 805 accurately. The spatial object 805 can be seen at its original position or with an acceptable shift.

As shown in FIG. 8A, when the subscriber sets up the spatial object 805 over the real scene 82, a height 'h' is required. Further, a viewable range including a horizontal fan angle '$\theta_1$' of the spatial object 805 is also required. The fan angle '$\theta_1$' may not be a symmetric angle relative to the spatial object 805. Still further, the viewable range of the spatial object 805 can be a distance range, such as a distance 'd' from a position 'a' to a position 'b'. The positions 'a' and 'b' respectively form two visual angles '$\theta_2$' and '$\theta_3$' relative to the spatial object 805. The fan angle '$\theta_1$', and the two visual angles '$\theta_2$' and '$\theta_3$' form a viewable range of the spatial object 805. Therefore, the height 'h', and the angles '$\theta_1$', '$\theta_2$' and '$\theta_3$' form the spatial information of the spatial object 805. The spatial information covers the ground-position data and the spatial-angle data that allow the user to search the spatial object within a specific range using his/her mobile device.

The database of the system for managing viewability of the location-based spatial object records a plurality of spatial objects. In the database, the positioning data and/or image data for positioning the spatial object and the searching criteria associated with the spatial object provided by the subscriber using the remote management interface are included. When the system finds out a plurality of spatial objects that are overlapped in a space within an overlapped time, a sorting scheme is applied. The system therefore gives the subscribers opportunity to affect the ranking of the spatial objects. In particular, the system allows the subscriber to set up a price factor for the spatial object for changing the ranking weight.

Figure 8B:
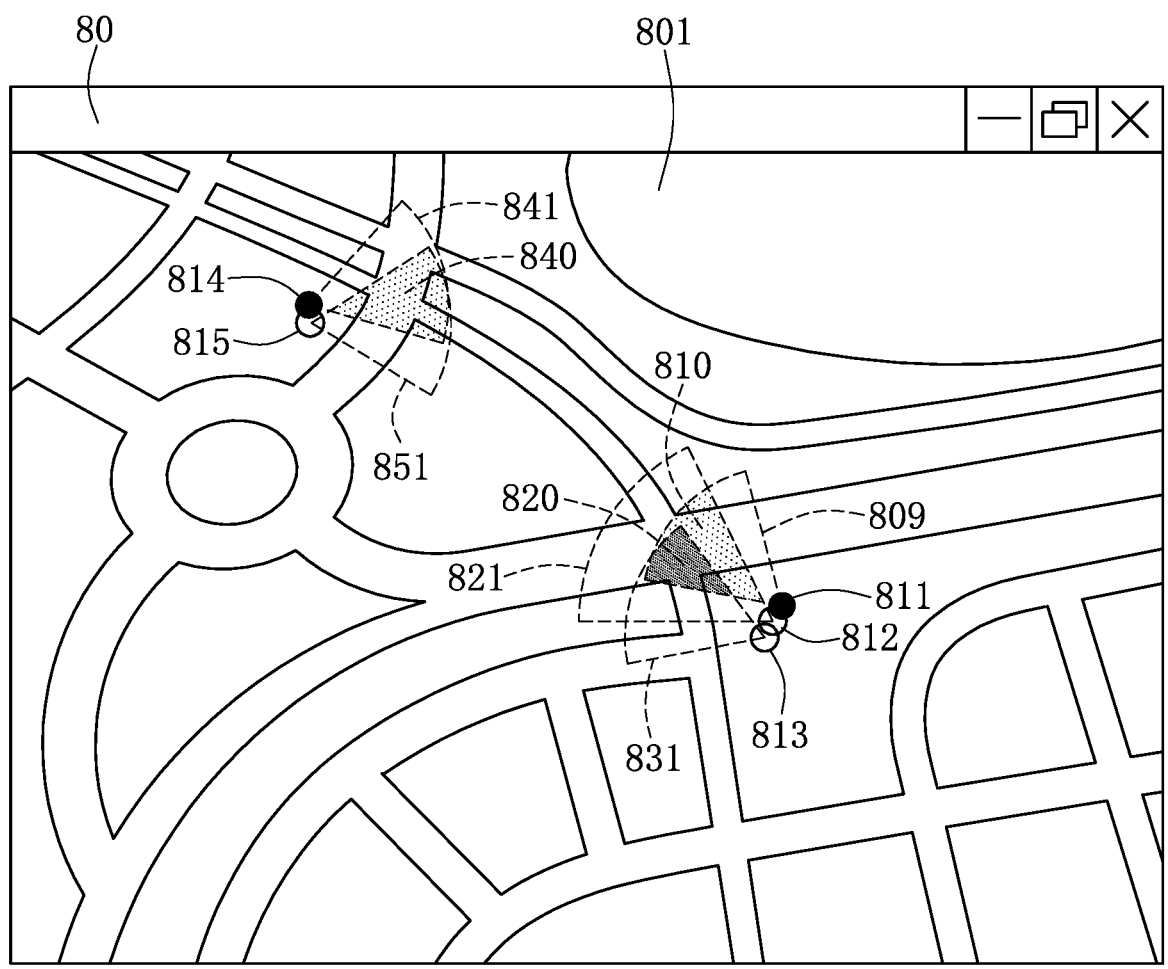
FIG. 8B and FIG. 8C show the schematic diagrams depicting the remote management interface provided by the system for managing the location-based spatial object according to one of the embodiments.

In FIG. 8B, several spatial objects are schematically shown on an electronic map. The electronic map acts as a remote management interface 80 that allows the subscriber to set up a viewable range of the spatial object intuitively using a first user interface 801. The present example shows a planar viewable range for each spatial object, and parts of the viewable ranges of the spatial objects are overlapped. The subscriber can set up the position and viewable range of one spatial object through this electronic map. The subscriber can also set up more than one spatial object over the electronic map at the same time.

This graphical remote management interface 80 allows the subscriber to control the spatial angle of the spatial object. The spatial object can be any or a combination of video, audio, and text. The remote management interface 80 also allows the subscriber to set up the content, text font, color, size, viewing angle, and/or any effect of the spatial object.

In the present diagram, several spatial objects are shown, and they have the same or different viewable ranges. As shown in the diagram, a first spatial object 811 has a first viewable range 809; a second spatial object 812 has a second viewable range 821; and a third spatial object 813 has a third viewable range 831; and parts of the viewable ranges are overlapped, e.g. the overlapped areas 810 and 820. Further, a fourth spatial object 814 has a fourth viewable range 841; and a fifth spatial object 815 has a fifth viewable range 851. An overlapped area 840 is formed between the fourth viewable range 841 and the fifth viewable range 851.

Figure 8C:
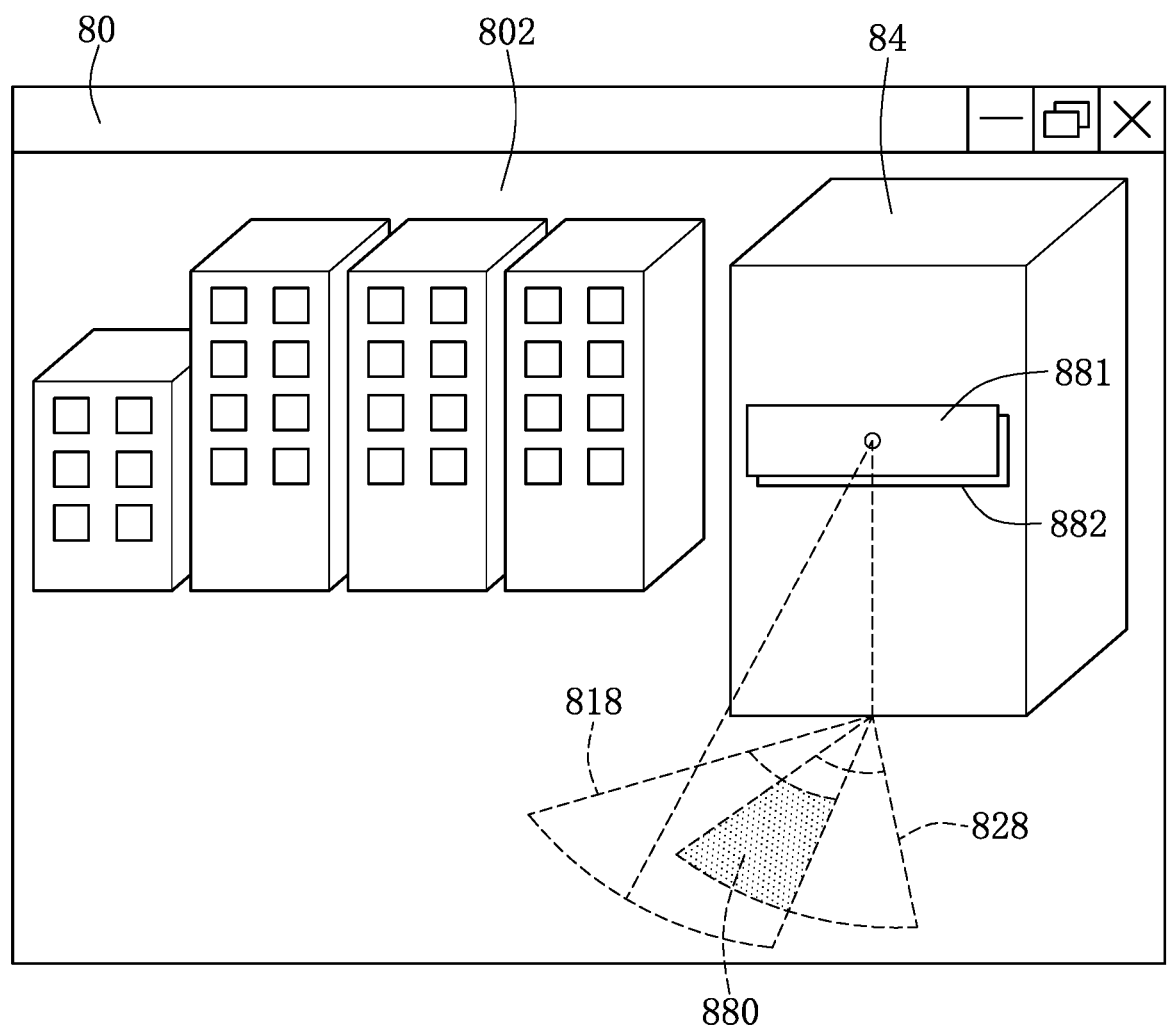

FIG. 8C shows a schematic diagram that depicts a second user interface 802. Two spatial objects, e.g. a sixth spatial object 881 and a seventh spatial object 882, are disposed over a real scene 84. The sixth spatial object 881 has a sixth viewable range 818, in view of FIG. 8A. The sixth viewable range 818 covers an area at the ground, and a spatial-angle range. The sixth viewable range 818 overlaps the seventh viewable range 828 of the seventh spatial object 882. The viewable ranges are used to confine the ground-position range and the spatial-angle range of the spatial objects 881 and 882, and/or to confine a distance range from the real scene 84. It is noted that the spatial range indicates a distance range and a spatial-angle range from a real scene. An overlapped viewable range 880 between the sixth viewable range 818 and the seventh viewable range 828 is formed in this example.

The remote management interface 80 allows the subscriber to set up the sixth spatial object 881 and the seventh spatial object 882 intuitively. The remote management interface 80 can prompt the subscriber to adjust the viewable range for both the sixth spatial object 881 and the seventh spatial object 882. The subscriber can adjust their time ranges and/or user range to eliminate the overlapping problem. Alternatively, the subscriber can also eliminate the overlapping problem by moving the spatial objects from their original positions to other positions via the second user interface 802. Furthermore, the overlapping problem can also be solved using the price factor that is incorporated to change the ranking weigh.

FIG. 9A through FIG. 9D show the diagrams schematically depicting the various viewable ranges that can be applied to the configuration of the spatial object. It is noted that the schematic diagrams are not used to limit the scope of the invention.

FIG. 9A shows a first setting menu 901 that prompts the subscriber to upload a spatial object and simultaneously specifies the attribute of the spatial object. The spatial object can be a text, an image, a video or an audio, or any combination thereof. The attribute allows the system to acknowledge the spatial object, and the system may recommend the subscriber to set up the spatial object at a position or in a type. For example, the system may provide larger space for disposing a video spatial object; and the system may provide a font menu for a text spatial object.

FIG. 9B shows a second setting menu 902 that prompts the subscriber to set up the users who can access the spatial object. In the present example, the subscriber can set up an age range, a gender, and a time range for a specific spatial object. It should be noted that the time range can be a validity period for the spatial object to be searchable and seeable.

Figures 9C, 9D:
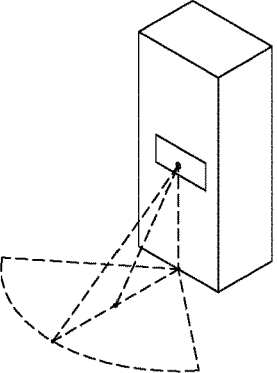

FIG. 9C shows a third setting menu 903 that prompts the subscriber to set up a user range through the remote management interface. The user range can indicate one or more users who can access the spatial object. If the spatial object is a personal message, the subscriber can specify a use. The subscriber can also specify a plurality of relevant users or all users to see the spatial object. The relevant users can be a group of users specified by the subscriber, for example the subscriber's community friend.

FIG. 9D shows a fourth setting menu 904 that prompts the subscriber to set up a time range and a spatial range for the spatial object. The time range can be any time period such as a morning, an afternoon, or an evening, or any day in a week. The subscriber can also setup the spatial-angle range, in view of FIG. 8A through FIG. 8C.

Thus, in the system for managing viewability of a location-based spatial object, a remote management interface is provided. The spatial object is such as a virtual message. The system allows the user to set up a viewable range for every spatial object. The user can also give the spatial objects different values for affecting the ranking weights through the remote management interface.

It is intended that the specification and depicted embodiments be considered exemplary only, with a true scope of the invention being determined by the broad meaning of the following claims.

What is claimed is:

1. A method for managing viewability of a location-based spatial object, performed in a server that provides a remote management interface for receiving computer-configurable spatial objects, as well as spatial information and searching criteria corresponding to every spatial object from multiple subscribers, so as to establish a database including the location-based spatial objects, wherein the method comprises:

the server receiving one of the spatial objects through the remote management interface;

setting up ground-position data corresponding to the spatial object using the remote management interface;

setting up spatial-angle data corresponding to the spatial object using the remote management interface, and wherein the spatial angle is a combination of an azimuth angle and an elevation angle; wherein the ground-position data and the spatial-angle data form spatial information corresponding to the spatial object;

setting up the searching criteria corresponding to the spatial object using the remote management interface, and wherein the searching criteria is a spatial range, a time range and a user range;

in the server, querying the database according to the spatial information, the time range and the user range for obtaining potential users who are able to access the spatial object; and completing the setting of the spatial object and creating a file of the location-based spatial object in the database;

wherein the server computes the spatial range corresponding to the spatial object according to the spatial information of the spatial object; and wherein the time range indicates a daily, weekly or monthly validity period and a display time that allows the users to access the spatial object.

2. The method as recited in claim 1, wherein the spatial object is one or any combination selected from a group of a text, an image, a video, and an audio.

3. The method as recited in claim 1, wherein the step of setting up the spatial information of the spatial object further comprises determining a position and size of the spatial object when it is configured to be attached to a real scene.

4. The method as recited in claim 3, wherein the real scene is analyzed by an image-processing method so as to form color block data and line data that are used to position the spatial object.

5. The method as recited in claim 1, further comprising an electronic map acting as a user interface used to set up the ground-position data that is a geographic location of the electronic map.

6. The method as recited in claim 5, further comprising a street view acting as a user interface that is used to set up the spatial-angle data.

7. The method as recited in claim 1, wherein the spatial range indicates a distance range and a spatial-angle range from a real scene.

8. The method as recited in claim 1, wherein information of the potential users who are able to access the spatial object indicates the number of the potential users, an age distribution and their genders.

9. The method as recited in claim 8, wherein the information of the potential users further comprise user information whose attributes are associated with the spatial object.

10. The method as recited in claim 1, wherein the user range is confined by any or a combination of age range, gender, education and interest of the users who are able to access the spatial object.

11. The method as recited in claim 1, wherein the user range is configured to be one or more user IDs or a group ID.

12. The method as recited in claim 1, wherein the server queries the database according to the spatial information and/or the searching criteria of the spatial object; a ranking weight is introduced when any other spatial object interferes with the spatial object.

13. The method as recited in claim 12, wherein the ranking weight is affected by a price factor corresponding to the spatial object.

14. The method as recited in claim 13, wherein the spatial object is one or any combination selected from a group of a text, an image, a video, and an audio.

15. A system for managing viewability of a location-based spatial object, comprising:

a database recording spatial objects and every spatial object's corresponding positioning data and/or an image data, as well as searching criteria corresponding to every spatial object; wherein every spatial object is with an identification data that is used to associate with the positioning data and/or the image data and searching criteria corresponding to every spatial object;

a server rendering a remote management interface that is used to receive the computer-configurable spatial objects, every spatial object's spatial information and searching criteria made by multiple subscribers, so as to establish the database including the location-based spatial objects; the server includes one or more processors that are used to perform a method for managing viewability of the location-based spatial object, wherein the method comprises:

the server receiving one of the spatial objects through the remote management interface;

setting up ground-position data corresponding to the spatial object using the remote management interface;

setting up spatial-angle data corresponding to the spatial object using the remote management interface, and wherein the spatial angle is a combination of an azimuth angle and an elevation angle; wherein the ground-position data and the spatial-angle data form spatial information corresponding to the spatial object;

setting up the searching criteria corresponding to the spatial object using the remote management interface, and wherein the searching criteria is a spatial range, a time range and a user range;

in the server, querying the database according to the spatial information, the time range and the user range for obtaining potential users who are able to access the spatial object; and completing the setting of the spatial object and creating a file of the location-based spatial object in the database;

wherein the server computes the spatial range corresponding to the spatial object according to the spatial information of the spatial object; and wherein the time range indicates a daily, weekly or monthly validity period and a display time that allows the users to access the spatial object.

16. The system as recited in claim 15, wherein the server queries the database according to the spatial information and/or the searching criteria of the spatial object; a ranking weight is introduced when any other spatial object interferes with the spatial object.

17. The system as recited in claim 16, wherein the database records the spatial information and the searching criteria of the spatial object and a price factor that affects the ranking weight.

18. The system as recited in claim 15, wherein the spatial object is one or any combination selected from a group of a text, an image, a video, and an audio.

* * * * *